June 27, 1933.    M. BAREISS    1,915,968
CLOTHES HANGER
Filed Nov. 16, 1932
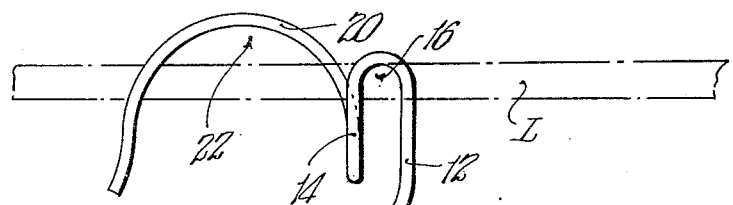
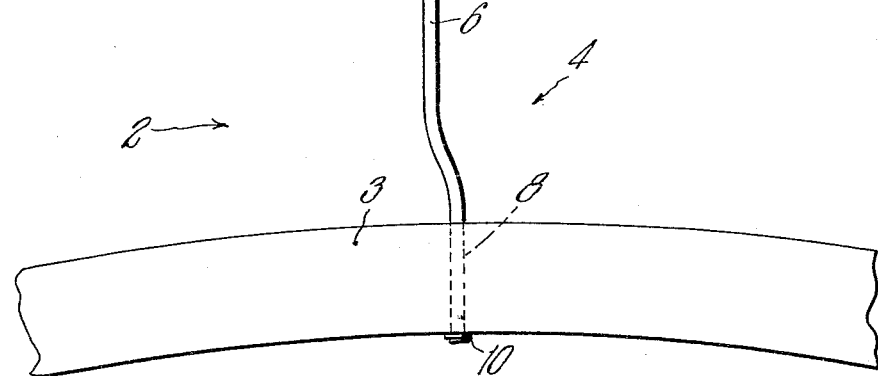
Fig. 1.
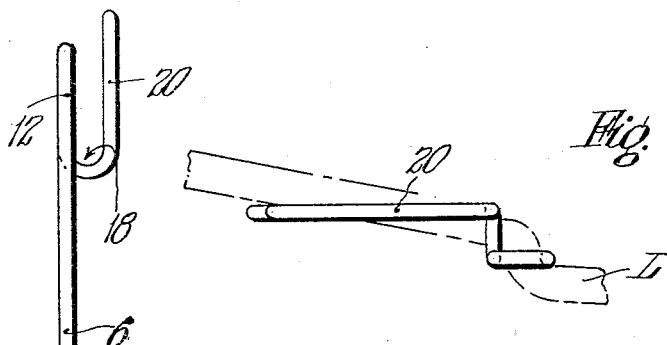
Fig. 2.
Fig. 3.
INVENTOR.
Mina Bareiss.
BY
Walter C. Row
ATTORNEY.

Patented June 27, 1933

1,915,968

UNITED STATES PATENT OFFICE

MINA BAREISS, OF WEST SPRINGFIELD, MASSACHUSETTS

CLOTHES HANGER

Application filed November 16, 1932. Serial No. 642,913.

This invention relates to improvements in clothes hangers and is directed more particularly to improvements in hooks associated with clothes hangers and the like.

The principal objects of the invention are directed to the provision of a coat hanger having a hook member affixed thereto which is formed in a novel manner with relatively off-set line engaging loops, so that the hanger may be hung on a clothes line or the like in such a way that it is held against accidental displacement.

Various novel features and advantages of the invention will be hereinafter more fully referred to in connection with the accompanying description of the preferred form of the invention which for purposes of disclosure is shown in the accompanying drawing wherein:

Fig. 1 is a side elevational view of a coat or clothes hanger having a hook embodying the novel features of the invention.

Fig. 2 is a plan view of a portion of the hanger shown in Fig. 1, and

Fig. 3 is a side elevational view of the same.

Referring now to the drawing more in detail the invention will be fully described.

A clothes hanger is represented at 2 in Fig. 1 which has a hook 4 embodying the features of the invention extending upwardly from an arm 3. This hook is formed to have shank portion 6 which as usual extends through the hanger 2 as at 8 and is headed over at 10 so as to be more or less rigidly fixed to the hanger.

The upper end of the shank portion is offset as at 12 from the main body 6 thereof and is then looped around or doubled upon itself to have a parallel portion as at 14 to provide an upper loop 16 between the portions 12 and 14. As will be seen the loop 16 is directed downwardly.

The lower end of the portion 14 is bent rearwardly and then upwardly to provide a lower loop 18 which is directed upwardly. Then the end portion 20 is bent upwardly and away from the loops just mentioned as best shown in Fig. 1. This latter portion 20 is curved to provide a third loop 22.

As will be seen this loop 22 or rather that part 20 of the hook forming the loop 22 is offset from the plane of the parts forming the loop 16. The forward loop 16 as shown in Fig. 1 is disposed forwardly of the rear loop 22 and is more or less in parallelism therewith being spaced therefrom by the intermediate loop 18.

As shown in Figs. 1 and 2 the hook may be hung on a line represented by L so that the line L passes through the forward loop 16 past the rear of part 14, between the parts 14 and 20 and through the loop 22 in such a way that the extremity of the member 20 overlies the line.

When so fixed to a line the hook is held against shifting movements. That is, it cannot move upwardly relative to the line because the line will engage in the intermediate loop 18 and of course it cannot pull downwardly relative to the line because the loops 22 and 16 will bring up against the upper side of the line.

By passing the line through the loops as described the line is more or less kinked and offset. It is frictionally engaged by the portions of the hook forming the loops so that the hook is held against movement longitudinally of the line. In fact the hook is so secured to the line that it is held against displacement therefrom but when desired may be readily removed therefrom.

Various changes may be made in the form of the hook without departing from the spirit and scope of the invention and therefore I prefer to be limited if at all by the appended claims rather than by the foregoing description.

What I claim is:

1. A clothes hanger comprising in combination, a clothes arm, a hook extending upwardly therefrom formed from a member having a shank portion the upper end of which portion is offset and bent to form a downwardly directed loop, a portion of the shank being turned rearwardly from said loop and then upwardly to form a second upwardly directed loop the extremity of the member being turned upwardly and away from said last-named loop so as to provide a third loop which is disposed in a different plane than the first-named loop for receiving a clothes line or the like.

2. A clothes hanger comprising in combination, a clothes arm, a hook member having a shank portion secured to said arm, the upper end of said shank portion being bent to form a U opening downwardly, a second U connected to the first-named U which opens upwardly and a third U connected to the second-named U which opens downwardly, the first and third-named U's being spaced from one another by the second-named U to lie in substantially parallel planes whereby the hook may be supported by a clothes line passing through all of said U's.

In testimony whereof I affix my signature.

MINA BAREISS.